US012175918B1

United States Patent
Luo et al.

(10) Patent No.: US 12,175,918 B1
(45) Date of Patent: Dec. 24, 2024

(54) TIMING CONTROLLER AND DISPLAY PANEL

(71) Applicant: Shenzhen China Star Optoelectronics Semiconductor Display Technology Co., Ltd., Guangdong (CN)

(72) Inventors: Dexing Luo, Guangdong (CN); Limin Wang, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/399,442

(22) Filed: Dec. 28, 2023

(30) Foreign Application Priority Data

Aug. 2, 2023 (CN) .......................... 202310971168.6

(51) Int. Cl.
*G09G 5/10* (2006.01)
*G06T 1/00* (2006.01)
*G09G 3/20* (2006.01)

(52) U.S. Cl.
CPC ............ *G09G 3/2096* (2013.01); *G06T 1/00* (2013.01); *G09G 2320/064* (2013.01); *G09G 2340/00* (2013.01)

(58) Field of Classification Search
CPC ........... G09G 3/2096; G09G 2320/064; G09G 2340/00; G06T 1/00
See application file for complete search history.

(56) References Cited

U.S. PATENT DOCUMENTS

| | | | | |
|---|---|---|---|---|
| 11,335,249 B1* | 5/2022 | Ma | ....................... | G09G 3/3225 |
| 11,908,385 B2* | 2/2024 | Zhang | ................... | G09G 3/2081 |
| 2004/0090446 A1* | 5/2004 | Lee | ...................... | G09G 3/2081 |
| | | | | 345/691 |
| 2004/0257324 A1* | 12/2004 | Hsu | ...................... | G09G 3/3406 |
| | | | | 345/89 |
| 2013/0321483 A1* | 12/2013 | You | .................... | G02F 1/134336 |
| | | | | 345/690 |
| 2016/0019849 A1* | 1/2016 | Chang | .................. | G09G 3/3607 |
| | | | | 345/88 |
| 2019/0114971 A1* | 4/2019 | Choi | ..................... | G09G 3/3266 |

FOREIGN PATENT DOCUMENTS

| CN | 1545081 A | * 11/2004 |
|---|---|---|
| JP | 2004341263 A | * 12/2004 |

* cited by examiner

*Primary Examiner* — Joe H Cheng
(74) *Attorney, Agent, or Firm* — PV IP PC; Wei Te Chung

(57) ABSTRACT

A timing controller includes: an image input module configured to output respective raw data according to accessed video source data; a data processing module configured to buffer the raw data in one row and splice each row of raw data into display time control data and display luminous control data; a grayscale mapping and dividing module configured to establish a mapping relationship between the display luminous control data and a high grayscale and a mapping relationship between the display time control data and a low grayscale, to output display data; and a timing control module configured to control writing of the display data.

19 Claims, 3 Drawing Sheets

TIMING CONTROLLER AND DISPLAY PANEL

CROSS-REFERENCE TO RELATED APPLICATION

This disclosure claims priority to a Chinese patent application No. 202310971168.6, filed on Aug. 2, 2023, which is incorporated by reference in the present disclosure in its entirety.

TECHNICAL FIELD

The present disclosure relates to a field of display technology, and more particularly, to a timing controller and a display panel.

BACKGROUND

Self-luminous display panels are widely used in a display market, and there is an obvious problem in the application of the self-luminous display panels that the luminous efficiency is lower in a low grayscale, so that the application thereof is limited.

In order to solve the problem of lower luminous efficiency in the low grayscale, a hybrid driving mode is adopted. In order to realize the hybrid driving mode, the timing controller is required to perform data processing in units of frames, which requires more hardware storage resources and thus the cost is increased.

SUMMARY

The present disclosure provides a timing controller and a display panel to alleviate the technical problem of requiring more hardware storage resources in a hybrid driving mode.

According to a first aspect, the present disclosure provides a timing controller including an image input module configured to output respective raw data according to accessed video source data; a data processing module, wherein an input terminal of the data processing module is connected to an output terminal of the image input module, and the data processing module is configured to buffer the raw data in rows and splice each row of raw data into display time control data and display luminous control data; a grayscale mapping and dividing module, wherein an input terminal of the grayscale mapping and dividing module is connected to an output terminal of the data processing module, and the grayscale mapping and dividing module is configured to establish a mapping relationship between the display luminous control data and a high grayscale and a mapping relationship between the display time control data and a low grayscale, to output display data; and a timing control module, wherein an input terminal of the timing control module is connected to an output terminal of the grayscale mapping and dividing module, and the timing control module is configured to control writing of the display data.

In some embodiments, the data processing module includes a first data processing unit and a second data processing unit, the first data processing unit buffers the raw data of the odd rows and splices the raw data of the odd rows to display time control data of the odd rows and display luminous control data of the odd rows; The second data processing unit buffers the raw data of the even rows and splices the raw data of the even rows to display time control data of the even rows and display luminous control data of the even rows.

According to a second aspect, the present disclosure provides a display panel including the timing controller according to at least one of the above-described embodiments, the display panel being a self-luminous display panel.

BRIEF DESCRIPTION OF THE DRAWINGS

Technical solutions and other beneficial effects of the present disclosure will be apparent from the following detailed description of specific embodiments thereof, taken in conjunction with the accompanying drawings.

DETAILED DESCRIPTION

Technical solutions in embodiments of the present disclosure will be clearly and completely described with reference to the accompanying drawings in the embodiments. It will be apparent that the described embodiments are only part of the embodiments of the present disclosure, and not all embodiments. Based on the embodiments in the present disclosure, all other embodiments obtained by a person skilled in the art without involving any inventive effort are within the scope of the present disclosure.

Furthermore, the terms "first" and "second" are used for descriptive purposes only and are not to be construed as indicating or implying relative importance or implicitly indicating the number of indicated technical features, such that the features defined by "first" and "second" may explicitly or implicitly include one or more of the recited features, and in the description of the present disclosure, "plurality" means two or more unless expressly and specifically defined otherwise.

Figure 1:
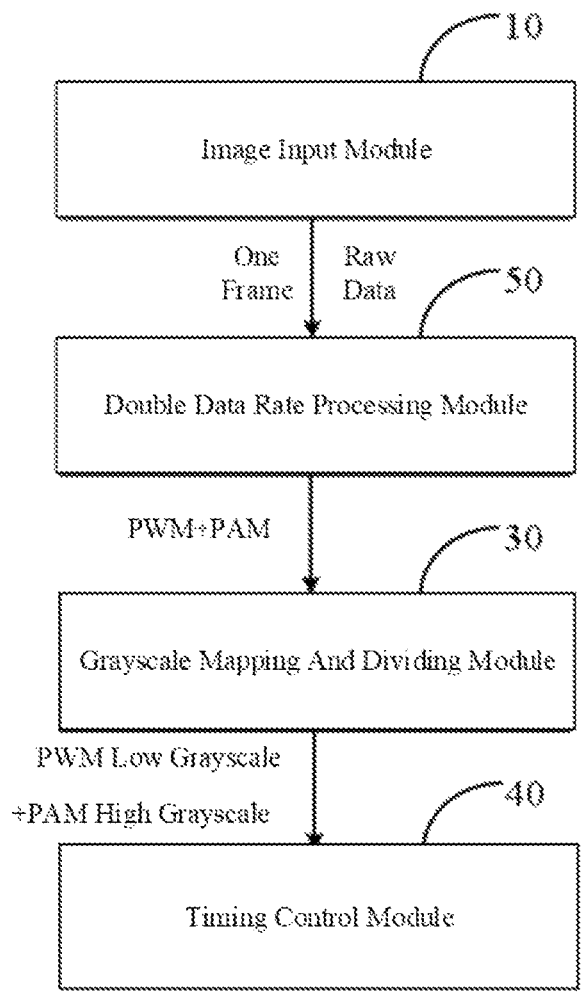
FIG. 1 is a schematic block diagram of a timing controller in the related art.
Figure 2:
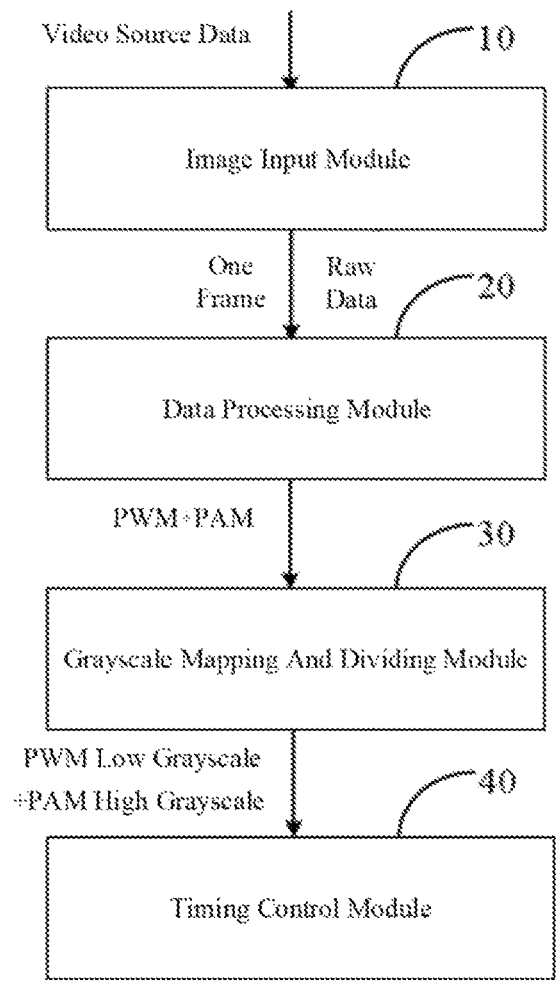
FIG. 2 is a schematic block diagram of a timing controller according to an embodiment of the present disclosure.

FIG. 1 is a schematic structural diagram of a timing controller in the related art. In order to solve the problem of lower luminous efficiency in a low grayscale, a hybrid driving mode is adopted. In order to realize the hybrid driving mode, the timing controller is required to perform data processing in units of frames, which requires more hardware storage resources and increases costs.

In the hybrid driving method, the pulse amplitude modulation (PAM) and the pulse width modulation (PWM) are used to control the light emission time and the light emission luminance in a frame to realize the light emission luminance in the frame. In an embodiment, the PWM driving method is used in the low grayscale, and the PAM driving method is used in a high grayscale, so that in the low grayscale, the light-emitting time may be reduced and thus the light-emitting current may be increased, so that the light-emitting efficiency may be improved in the low grayscale.

However, after receiving video source data provided by a video source, the image input module transmits data to a double data rate processing module 50 on a frame-by-frame basis. In this case, the double data rate processing module 50 needs to have a storage space for at least one frame of the video source data. This increases hardware storage resources, which in turn increases costs.

In particular, the cost is further increased in the case where the double data rate processing module 50 employs double data rate synchronous dynamic random access memory (DDR SDRAM), as the DDR SDRAM is an external storage resource.

The grayscale mapping and segmentation module 30 is configured to perform grayscale mapping and segmentation on received PWM data and PAM data, so that the PWM data is used for display control in the low grey level, and the PAM data is used for display control in the high grey level.

The timing control module 40 is configured to control data output from the grayscale mapping and segmentation module 30 to be written to a corresponding sub-pixel in a certain form.

In view of the above-mentioned problem of more hardware storage resources being required in the hybrid driving mode, the present embodiment provides a timing controller including an image input module 10, a data processing module 20, a grayscale mapping and dividing module 30, and a timing control module 40. The image input module 10 is configured to output respective raw data according to accessed video source data. An input terminal of the data processing module 20 is connected to an output terminal of the image input module 10, and the data processing module 20 is configured to buffer the raw data in rows and splice each row of raw data into display time control data and display luminous control data. An input terminal of the grayscale mapping and dividing module 30 is connected to an output terminal of the data processing module 20, and the grayscale mapping and dividing module 30 is configured to establish a mapping relationship between the display luminous control data and a high grayscale and a mapping relationship between the display time control data and a low grayscale, to output display data. An input terminal of the timing control module 40 is connected to an output terminal of the grayscale mapping and dividing module 30, and the timing control module 40 is configured to control writing of the display data.

It will be appreciated that in the timing controller according to the present embodiment, the data processing module 20 is configured to buffer the raw data in rows and splice each row of raw data into display time control data and display luminous control data. The grayscale mapping and dividing module 30 is configured to establish a mapping relationship between the display luminous control data and a high grayscale and a mapping relationship between the display time control data and a low grayscale, to output display data. The timing control module 40 is configured to control writing of the display data. The display time control and the display luminous control are respectively used in the low grayscale and the high grayscale, so that not only the hybrid driving mode is realized, but also the data processing module 20 processes raw data in only one row in comparison with the conventional processing of the raw data in the unit of frame. The amount of the processed raw data is less, which reduces the required hardware storage resources and reduces the cost.

Note that the display time control data includes PWM data and the display luminous control data includes PAM data.

The grayscale mapping and dividing module 30 is configured to identify the display grayscale and divide the display grayscale into the high grayscale and the low grayscale. In this case, a mapping relationship between the display luminous control data and the high grayscale is established for outputting the display luminous control data as the display data in the high grayscale. Therefore, the display luminous is controlled by the display luminous control data in the high grayscale; A mapping relationship between the display time control data and the low grayscale is used to output the display time control data as the display data in the low grayscale. Therefore, the display time may be controlled by the display time control data in the low grayscale, specifically, the display time may be decreased.

The video source data is mixed gray-scale image data such as a computer-side projection video source and a self-designed pattern.

Figure 3:
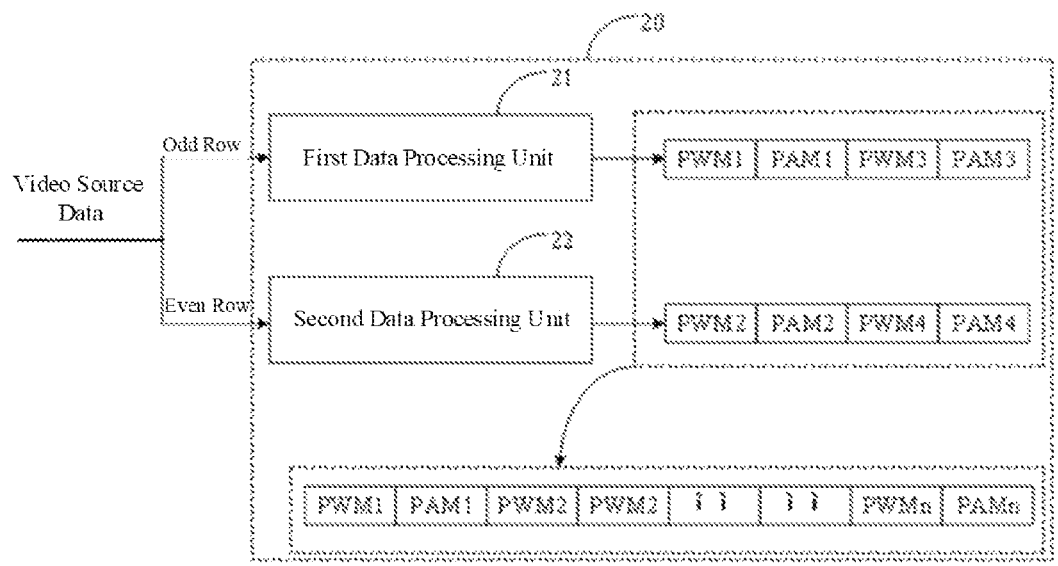
FIG. 3 is a schematic diagram of a data processing module according to an embodiment of the present disclosure.

In an embodiment, as shown in FIG. 3, the data processing module 20 includes a first data processing unit 21 and a second data processing unit 22. The first data processing unit 21 is configured to buffer the raw data in an odd row and splice the raw data of the odd row into the display time control data of the odd row and the display luminous control data of the odd row. The second data processing unit 22 is configured to buffer the raw data of an even row and splice the raw data of the even row into the display time control data of the even row and the display luminous control data of the even row.

It is to be noted that the data processing module 20, in the process of receiving the video source data, may receive and process the video source data in units of rows. For example, the first data processing unit 21 is configured to buffer a first row of display time control data (PWM1) and the first row of display luminous control data (PAM1), and then the second data processing unit 22 is configured to buffer a second row of display time control data (PWM2) and the second row of display luminous control data (PAM2). The first data processing unit 21 is configured to buffer a third row of display time control data (PWM3) and the third row of display luminous control data (PAM3), and then the second data processing unit 22 is configured to buffer a fourth row of display time control data (PWM4) and the fourth row of display luminous control data (PAM4), and so on.

In other embodiments, the first data processing unit 21 is configured to buffer the raw data of an even row and splice the raw data of the even row into the display time control data of the even row and the display luminous control data of the even row. The second data processing unit 22 is configured to buffer the raw data in an odd row and splice the raw data of the odd row into the display time control data of the odd row and the display luminous control data of the odd row.

In one embodiment, as shown in FIG. 3, the first data processing unit 21 is configured to sequentially output the display time control data of the odd row and the display luminous control data of the odd row, and then the second data processing unit 22 is configured to sequentially output the display time control data of the even row and the display luminous control data of the even row.

It is to be noted that in the data reading process of the data processing module 20, the data are sequentially read alternately. For example, the first data processing unit 21 is configured to sequentially read the display time control data (PWM1) of the first row and the display luminous control data (PAM1) of the first row, the second data processing unit 22 is configured to sequentially read the display time control data (PWM2) of the second row, and the display luminous control data (PAM2) of the second row, . . . , the second data processing unit 22 is further configured to sequentially read the display time control data (PWMn) of the n-th row and the display luminance control data (PAMn) of the n-th row.

That is, in one frame, the grayscale mapping and dividing module 30 is configured to output the display time control data and then output the display luminous control data. This advantageously reduces the display time and then increases the luminous current (or luminous luminous), thereby improving the luminous efficiency in the low grayscale.

In an embodiment, the first data processing unit 21 is a first static random access memory and the second data processing unit 22 is a second static random access memory.

It should be noted that in an embodiment, static random-access memory (SRAM) is used instead of DDR for data processing, thereby reducing usage of DDR and further saving DDR particles. Compared with the higher design complexity of the DDR, the SRAM may be used to reduce the design complexity and the development time. Since the DDR is included in a memory externally connected to a field programmable gate array (FPGA)/application specific integrated circuit (ASIC), a printed circuit board (PCB) has a relatively more wiring interference factors, has a lower integration degree compared with the SRAM, has a delay and signal quality not as short and strict as that of the FPGA/ASIC, and has the timing convergence more difficult to converge compared to SRAM. The DDR belongs to an external storage resource, and is relatively high in cost, and because the design complexity is higher than that of the SRAM, the labor cost caused by the development cycle is relatively higher.

Figure 4:
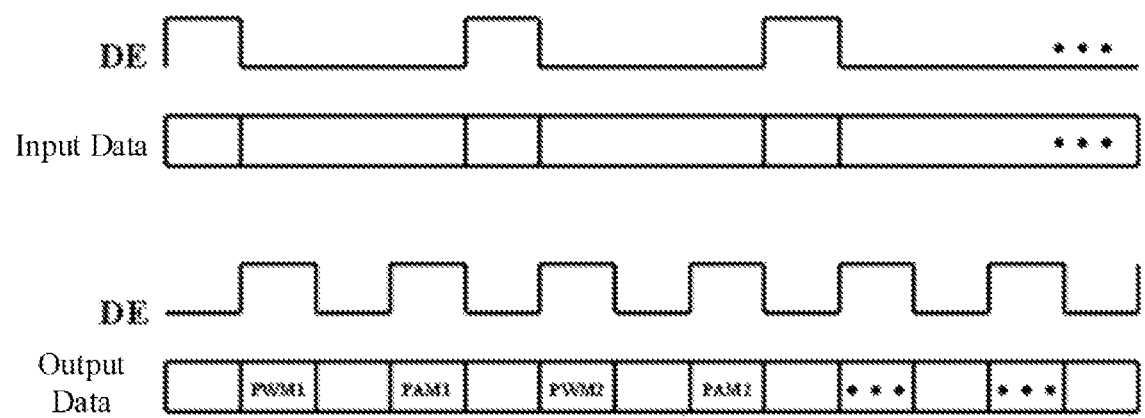
FIG. 4 is a timing diagram of a timing controller according to an embodiment of the present disclosure.

In an embodiment, as shown in FIG. 4, the data processing module 20 is configured to control input data and output data by using a same enable signal DE. It will be appreciated that the synchronization of input and output may be improved by controlling the input data and the output data by using the same enable signal DE.

Note that when the arrival of a first pulse of the enable signal DE from left to right (indicated by the enable signal DE on the upper side), the input data of the first row is supplied to the data processing module 20. When the arrival of a second pulse and a third pulse of the enable signal DE from left to right (indicated by the enable signal DE on the lower side), the output data read from the data processing module 20 are sequentially the display time control data (PWM1) of the first row, the display brightness control data (PAM1) of the first row in this order.

Then, when the arrival of a fourth pulse of the enable signal DE from left to right (indicated by the enable signal DE on the upper side), the input data of the second row is supplied to the data processing module 20, and when the arrival of a fifth pulse and a sixth pulse of the enable signal DE from left to right (indicated by the enable signal DE on the lower side), the output data read from the data processing module 20 is sequentially the display time control data (PWM2) of the second row and the display luminous control data (PAM2) of the second row. Other input data and output data may be sequentially and analogously.

In an embodiment, the present embodiment provides a display panel including a timing controller according to at least one of the above-described embodiments.

It will be appreciated that since the display panel according to an embodiment includes the timing controller according to at least one of the above-described embodiments, the data processing module 20 is configured to buffer the raw data in rows and splice each row of raw data into display time control data and display luminous control data. The grayscale mapping and dividing module 30 is configured to establish a mapping relationship between the display luminous control data and a high grayscale and a mapping relationship between the display time control data and a low grayscale, to output display data. The timing control module 40 is configured to control writing of the display data. The display time control and the display luminous control are respectively used in the low grayscale and the high grayscale, so that not only the hybrid driving mode is realized, but also the data processing module 20 processes raw data in only one row in comparison with the conventional processing of the raw data in the unit of frame. The processed amount of the raw data is less, which reduces the required hardware storage resources and reduces the cost.

Note that the display panel includes a self-emitting display panel, for example, a mini light-emitting diode display panel, an organic light-emitting diode display panel, a micro light-emitting diode display panel, or a quantum dot light-emitting diode display panel.

An embodiment provides a data processing method performed by the above timing controller according to any of the embodiments including: outputting raw data based on accessed video source data; buffering the raw data in rows and splicing each of the rows of the raw data into display time control data and display luminous control data; establishing a mapping relationship between the display luminous control data and a high grayscale and a mapping relationship between the display time control data and a low grayscale, to output display data; and writing the display data to subpixels.

In an embodiment, the buffering of the raw data in rows and the splicing of each of the rows of the raw data into display time control data and display luminous control data includes: buffering the raw data of an odd row of the rows and splicing the raw data of the odd row into the display time control data of the odd row and the display luminous control data of the odd row; and buffering the raw data of an even row of the rows and splicing the raw data of the even row into the display time control data of the even row and the display luminous control data of the even row.

In an embodiment, the buffering of the raw data of the odd row of the rows and the splicing of the raw data of the odd row into the display time control data of the odd row and the display luminous control data of the odd row includes: sequentially outputting the display time control data in odd row and the display luminous control data of the odd row, and then sequentially outputting the display time control data of the even row and the display luminous control data of the even row.

In an embodiment, the establishing of the mapping relationship between the display luminous control data and the high grayscale and a mapping relationship between the display time control data and the low grayscale includes: outputting the display luminous control data as the display data in the high grayscale, or outputting the display time control data as the display data in the low grayscale.

In an embodiment, the establishing of the mapping relationship between the display luminous control data and the high grayscale and a mapping relationship between the display time control data and the low grayscale further includes: outputting the display time control data and then outputting the display luminous control data.

In an embodiment, the establishing of the mapping relationship between the display luminous control data and the high grayscale and a mapping relationship between the display time control data and the low grayscale further includes: identifying display grayscale and dividing the display grayscale into the high grayscale and the low grayscale.

An embodiment provides a timing controller includes: a memory, a processor, and a data processing program stored on the memory and operable on the processor, wherein the data processing program, when executed by the processor, implements operations of the above data processing method according to any of the embodiments.

An embodiment provides a nonvolatile computer readable storage medium having stored a data processing program thereon which, when executed by a processor, implements operations of the above data processing method according to any of the embodiments.

In the above-mentioned embodiments, the description of each embodiment has its own emphasis, and parts not described in detail in a certain embodiment may be referred to the related description of other embodiments.

The timing controller and the display panel according to an embodiment of the present disclosure are described in detail above, and the principles and embodiments of the present disclosure are described herein by using specific examples. The description of the above embodiments is only used to help understand the technical solutions and core ideas of the present disclosure; those of ordinary skill in the art should understand that it is still possible to modify the technical solutions recorded in the foregoing embodiments, and these modifications or replacements do not cause the essence of the corresponding technical solutions to deviate from the scope of the technical solutions of the embodiments of the present disclosure.

What is claimed is:

1. A timing controller, comprising:
   an image input module configured to output respective raw data based on accessed video source data;
   a data processing module, wherein an input terminal of the data processing module is connected to an output terminal of the image input module, and the data processing module is configured to buffer the raw data in rows and splice each of the rows of the raw data into display time control data and display luminous control data;
   a grayscale mapping and dividing module, wherein an input terminal of the grayscale mapping and dividing module is connected to an output terminal of the data processing module, and the grayscale mapping and dividing module is configured to establish a mapping relationship between the display luminous control data and a high grayscale and a mapping relationship between the display time control data and a low grayscale, to output display data; and
   a timing control module, wherein an input terminal of the timing control module is connected to an output terminal of the grayscale mapping and dividing module, and the timing control module is configured to control writing of the display data.

2. The timing controller of claim 1, wherein the data processing module comprises:
   a first data processing unit configured to buffer the raw data of an odd row of the rows and splice the raw data of the odd row into the display time control data of the odd row and the display luminous control data of the odd row; and
   a second data processing unit configured to buffer the raw data of an even row of the rows and splice the raw data of the even row into the display time control data of the even row and the display luminous control data of the even row.

3. The timing controller of claim 2, wherein the first data processing unit is configured to sequentially output the display time control data in odd row and the display luminous control data of the odd row, and then the second data processing unit is configured to sequentially output the display time control data of the even row and the display luminous control data of the even row.

4. The timing controller of claim 2, wherein the first data processing unit is a first static random access memory and the second data processing unit is a second static random access memory.

5. The timing controller of claim 4, wherein the data processing module is configured to control input data and output data by using a same enable signal.

6. The timing controller of claim 1, wherein the grayscale mapping and dividing module is configured to output the display luminous control data as the display data in the high grayscale, or output the display time control data as the display data in the low grayscale.

7. The timing controller of claim 6, wherein in a frame, the grayscale mapping and dividing module is configured to output the display time control data and then output the display luminous control data.

8. The timing controller of claim 6, wherein the grayscale mapping and dividing module is further configured to identify display grayscale and divide the display grayscale into the high grayscale and the low grayscale.

9. The timing controller of claim 1, wherein the video source data is image data of a mixed grayscale.

10. A display panel comprising a timing controller, wherein the timing controller, comprising:
    an image input module configured to output respective raw data based on accessed video source data;
    a data processing module, wherein an input terminal of the data processing module is connected to an output terminal of the image input module, and the data processing module is configured to buffer the raw data in rows and splice each of the rows of the raw data into display time control data and display luminous control data;
    a grayscale mapping and dividing module, wherein an input terminal of the grayscale mapping and dividing module is connected to an output terminal of the data processing module, and the grayscale mapping and dividing module is configured to establish a mapping relationship between the display luminous control data and a high grayscale and a mapping relationship between the display time control data and a low grayscale, to output display data; and
    a timing control module, wherein an input terminal of the timing control module is connected to an output terminal of the grayscale mapping and dividing module, and the timing control module is configured to control writing of the display data, and
    wherein the display panel is a self-luminous display panel.

11. The display panel of claim 10, wherein the data processing module comprises:
    a first data processing unit configured to buffer the raw data of an odd row of the rows and splice the raw data of the odd row into the display time control data of the odd row and the display luminous control data of the odd row; and
    a second data processing unit configured to buffer the raw data of an even row of the rows and splice the raw data of the even row into the display time control data of the even row and the display luminous control data of the even row.

12. The display panel of claim 11, wherein the first data processing unit is configured to sequentially output the display time control data in odd row and the display luminous control data of the odd row, and then the second data processing unit is configured to sequentially output the display time control data of the even row and the display luminous control data of the even row.

13. The display panel of claim 11, wherein the first data processing unit is a first static random access memory and the second data processing unit is a second static random access memory.

14. The display panel of claim 13, wherein the data processing module is configured to control input data and output data by using a same enable signal.

15. The display panel of claim 10, wherein the grayscale mapping and dividing module is configured to output the display luminous control data as the display data in the high grayscale, or output the display time control data as the display data in the low grayscale.

16. The display panel of claim 15, wherein in a frame, the grayscale mapping and dividing module is configured to output the display time control data and then output the display luminous control data.

17. The display panel of claim 15, wherein the grayscale mapping and dividing module is further configured to identify display grayscale and divide the display grayscale into the high grayscale and the low grayscale.

18. The display panel of claim 10, wherein the video source data is image data of a mixed grayscale.

19. A data processing method, comprising:
outputting raw data based on accessed video source data;
buffering the raw data in rows and splicing each of the rows of the raw data into display time control data and display luminous control data;
establishing a mapping relationship between the display luminous control data and a high grayscale and a mapping relationship between the display time control data and a low grayscale, to output display data; and
writing the display data to subpixels.

* * * * *